(12) United States Patent
Ukai et al.

(10) Patent No.: US 6,756,557 B1
(45) Date of Patent: Jun. 29, 2004

(54) POWER SUPPLY FOR WIRE ELECTRIC DISCHARGE MACHINING

(75) Inventors: Yoshikazu Ukai, Tokyo (JP); Seiji Satou, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/168,178

(22) PCT Filed: Oct. 20, 2000

(86) PCT No.: PCT/JP00/07334

§ 371 (c)(1),
(2), (4) Date: Jun. 19, 2002

(87) PCT Pub. No.: WO02/31444

PCT Pub. Date: May 2, 2002

(51) Int. Cl.[7] .................................................. B23H 1/02
(52) U.S. Cl. .................................. 219/69.13; 219/69.18
(58) Field of Search .......................... 219/69.13, 69.18

(56) References Cited

U.S. PATENT DOCUMENTS

| | | | | |
|---|---|---|---|---|
| 4,678,884 A | * | 7/1987 | Obara et al. ............. | 219/69.18 |
| 4,857,688 A | * | 8/1989 | Aso et al. ................ | 219/69.14 |
| 5,869,797 A | * | 2/1999 | Goto et al. .............. | 219/69.13 |
| 6,211,481 B1 | * | 4/2001 | Toyonaga et al. ........ | 219/69.13 |

FOREIGN PATENT DOCUMENTS

| | | |
|---|---|---|
| JP | Hei 1-257513 | 10/1989 |
| JP | Hei. 3-79221 | 4/1991 |
| JP | Hei. 9-239622 | 9/1997 |

OTHER PUBLICATIONS

Micro–Machining by EDM in Gas; written by Yoshida and Kunieda, Collected papers of Japan society of Electrical-Machining Engineers national convention, (1996) p. 77–80.
Written by furutachi and Kunieda, Collected papers of The Japan Society for Precision Engineering autumn convention (1999) p. 415.
Improvement of Accuracy of Second–Cut using Dry WEDM; Writtten by Adachi, Furutachi and Kunieda, Shaping technology, vol. 14, No. 7 (1999) p. 145–155.

* cited by examiner

*Primary Examiner*—Geoffrey S. Evans
(74) *Attorney, Agent, or Firm*—Sughrue Mion, PLLC (57) ABSTRACT

In a power source apparatus for wire electric discharge machining capable of applying voltages of both of positive and opposite polarities to a gap between a wire electrode (1a) and a workpiece (2), there is provided a controller (14) for applying a first voltage pulse to the gap for predetermined time T1 and then applying a second voltage pulse of a polarity opposite to the first voltage pulse for predetermined time T2a necessary for the gap voltage to become a predetermined voltage lower than or equal to a voltage Va capable of starting an electric discharge after a lapse of predetermined time t set for prevention of breakage of a switch. The apparatus is used in machining for performing at least two machining operations selected from machining in machining liquid, machining in mist and machining in gas. Wire electric discharge machining with high reliability suitable for high-accurate machining can be implemented.

7 Claims, 11 Drawing Sheets

PRIOR ART

FIG.11 PRIOR ART

POWER SUPPLY FOR WIRE ELECTRIC DISCHARGE MACHINING

This application is a 371 of PCT/JP00/07334, filed Oct. 20, 2000.

TECHNICAL FIELD

This invention relates to improvements in a power source apparatus for wire electric discharge machining for supplying machining electric power to a gap between a wire electrode and a workpiece used in wire electric discharge machining for generating an electric discharge in the gap between the wire electrode and the workpiece to machine the workpiece.

BACKGROUND ART

Electric discharge machining has built a steady position as a machining technique of a mold etc. and has been frequently used in fields of mold machining of automobile industry, home electrical appliance industry, semiconductor industry and so on.

FIG. 8 is an explanatory diagram of a mechanism of electric discharge machining and in the drawing, numeral 1 is an electrode, and numeral 2 is a workpiece, and numeral 3 is an arc column, and numeral 4 is machining liquid, and numeral 5 is a work scrap generated by electric discharge machining. Removal machining of the workpiece 2 by an electric discharge proceeds while repeating the following cycles (a) to (e) (corresponding to FIGS. 8A to 8E). That is, (a) is formation of the arc column 3 by generation of an electric discharge, and (b) is local melt and vaporization of the machining liquid 4 by heat energy of the electric discharge, and (c) is occurrence of vaporization explosive force of the machining liquid 4, and (d) is scattering of a melt part (work scraps 5), and (e) is cooling by the machining liquid, solidification and an insulation recovery of a gap.

This invention relates to wire electric discharge machining used in boring machining, cutting machining, etc. among electric discharge machining. In the wire electric discharge machining, a demand for high accuracy particularly grows and, for example, in machining of a high-accurate mold used in semiconductor industry etc., high machining accuracy of the order of 1 to 2 $\mu$m has been demanded.

Figure 9A:
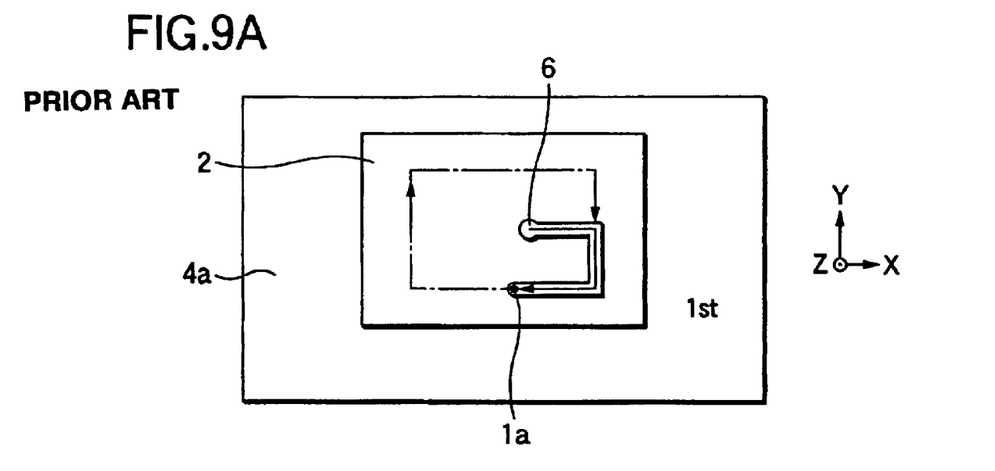
FIGS. 9A to 9C are explanatory diagrams showing an example of a machining process of wire electric discharge machining.
Figure 9B:
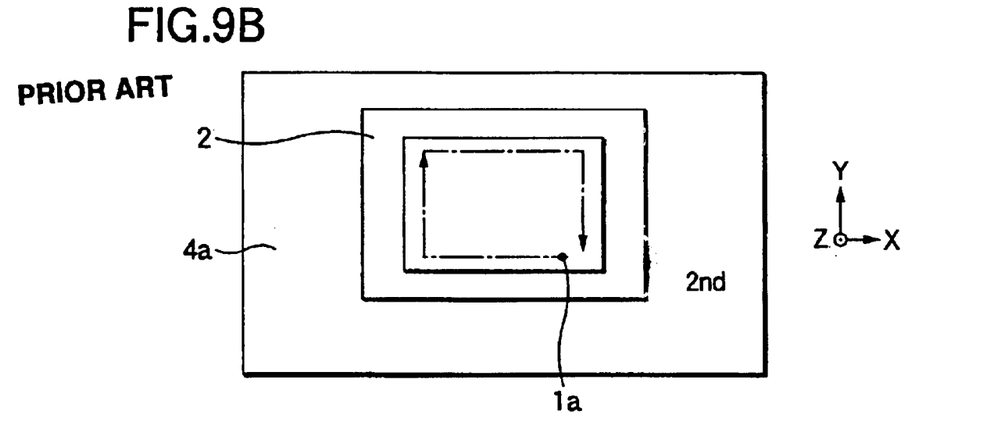
Figure 9C:
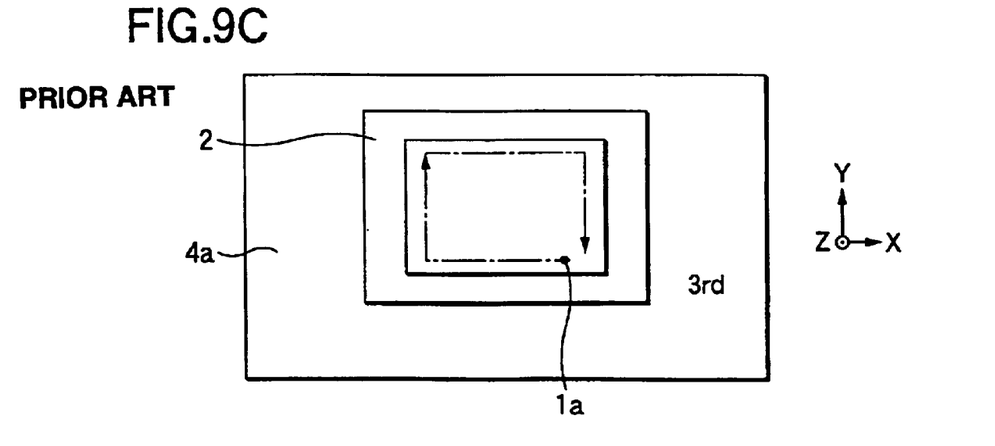

FIGS. 9A to 9C are explanatory diagrams showing an example of a machining process of wire electric discharge machining and in the drawing, numeral 1a is a wire electrode, and numeral 2 is a workpiece, and numeral 4a is water which is machining liquid, and numeral 6 is an initial hole, and FIG. 9A shows a first cut which is rough machining, and FIG. 9B shows a second cut which is semi-finishing machining after the rough machining, and FIG. 9C shows a situation of a third cut which is final finishing machining.

A machining example of the first cut of FIG. 9A shows machining for passing the wire electrode 1a through the initial hole 6 and boring the workpiece 2. In the case of such a first cut, since surface roughness and accuracy are finished in the subsequent machining, strict surface roughness and accuracy are not very required and it is important to increase a machining speed particularly in order to improve productivity. In the wire electric discharge machining, in order to increase the machining speed, the water 4a is jetted to a gap to efficiently eject work scraps from the gap. Also, in order to eliminate variations in the jet of the water 4a to the gap to prevent a break in the wire electrode 1a, a method for storing the water 4a in a machining bath (not shown) to immerse the workpiece 2 is used. In this manner, machining liquid supply means for supplying the machining liquid to the gap is used.

In the conventional wire electric discharge machining method as described above, machining of the second cut (FIG. 9B) and the third cut (FIG. 9C), etc. after the first cut (FIG. 9A) is also performed in the water 4a which is machining liquid.

When a voltage is applied to a gap between the wire electrode 1a and the workpiece 2, mutually attractive force acts in a plus polarity and a minus polarity, so that the wire electrode 1a with small rigidity is pulled to the side of the workpiece 2 by this electrostatic force. This causes vibration of the wire electrode 1a and there was a problem that high-accurate machining becomes difficult due to such vibration.

Also, in a state in which vaporization explosive force of the machining liquid occurs by electric discharge energy (for example, FIG. 8C), large force in a direction opposite to the workpiece 2 acts on the wire electrode 1a by the vaporization explosive force of the machining liquid and vibration occurs. Due to such vibration, there was a problem that unevenness occurs in a shape of the workpiece 2 and leads to a deterioration of accuracy.

In semiconductor industry etc. which are use fields of the wire electric discharge machining, for example, in machining of a mold etc. of an IC lead frame, a use in which extremely high accuracy and very smooth surface roughness are required with respect to a workpiece with shape accuracy of 1 $\mu$m and surface roughness of 1 $\mu$mRmax or less increases and particularly in such a use, the problems caused by the vibration etc. of the wire electrode as described above were remarkable.

Figure 10:
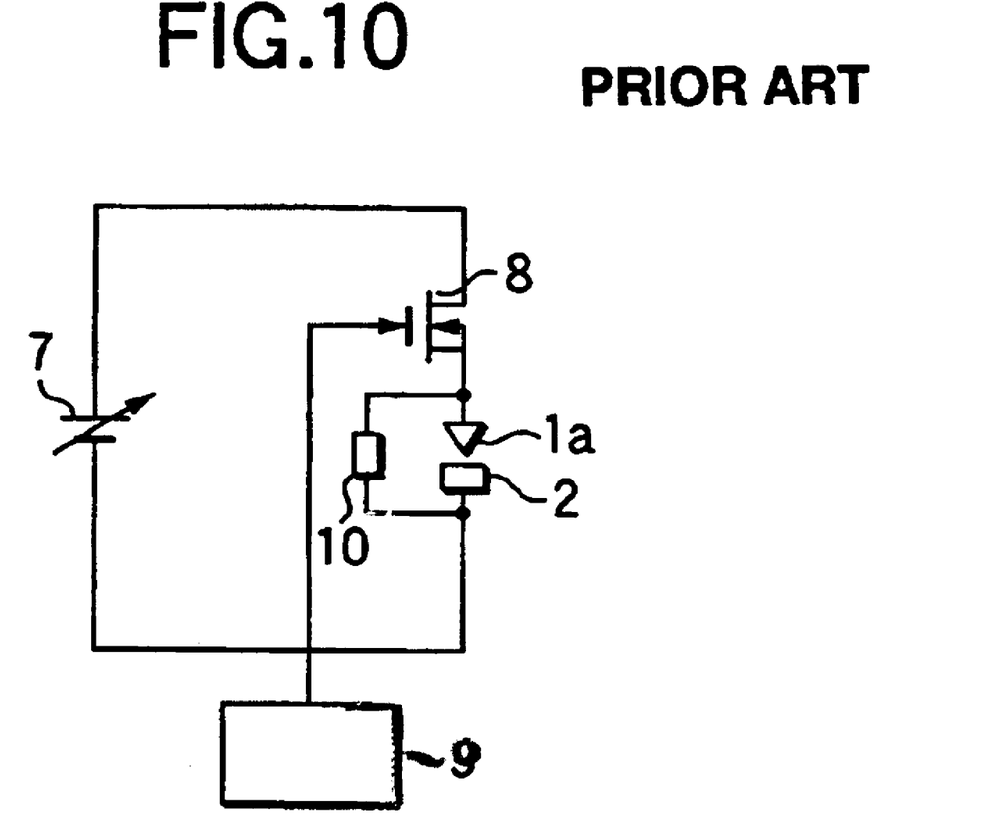
FIG. 10 is a block diagram showing a configuration of a conventional power source apparatus for wire electric discharge machining.

FIG. 10 is a block diagram showing a configuration of a conventional power source apparatus for wire electric discharge machining, and in the drawing, numeral 1a is a wire electrode, and numeral 2 is a workpiece, and numeral 7 is a DC power source for supplying a DC voltage to a gap between the wire electrode 1a and the workpiece 2, and numeral 8 is switching means, and numeral 9 is control means for performing on-off control of the switching means 8, and numeral 10 is a gap resistor. A configuration in which the gap resistor 10 is added to the gap between the wire electrode 1a and the workpiece 2 and residual energy due to the presence of a floating capacitance etc. of the gap is consumed is adopted.

Figure 11:
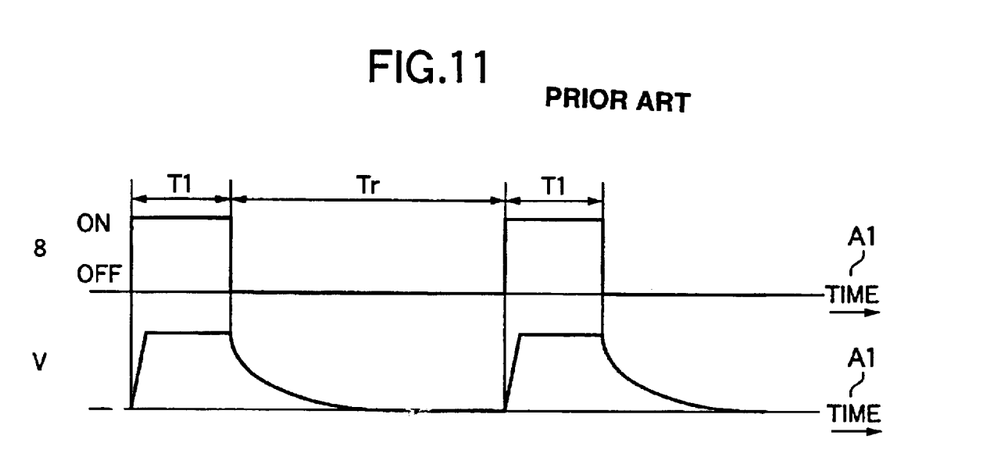
FIG. 11 is an explanatory diagram showing a gap voltage waveform in the conventional power source apparatus for wire electric discharge machining.

FIG. 11 is an explanatory diagram showing a gap voltage waveform in the conventional power source apparatus for wire electric discharge machining of a circuit configuration as shown in FIG. 10 and in the drawing, V is a gap voltage, and T1 is applied time of a voltage pulse, and Tr is pause time. After turning off the switching means 8, the gap voltage V decreases exponentially and a fall of the gap voltage V cannot be performed speedily.

Also, a power source apparatus for electric discharge machining capable of improving machining quality of a workpiece and preventing electrolytic corrosion by changing a polarity of a voltage pulse every voltage pulse of a predetermined number is disclosed in JP-A-1-257513, but there is no disclosure with regard to the fact of speedily performing a fall of the voltage pulse in a gap, and a voltage remaining in the gap after the completion of voltage application does not fall speedily, so that there were problems that time in which it has become higher than or equal to a voltage capable of starting an electric discharge is present and it is difficult to suppress occurrence of an electric discharge during this time and so on.

In the conventional power source apparatus for wire electric discharge machining as described above, there was a problem that it is difficult to shorten pause time since it takes time for consumption of the residual energy of the gap. Also, there was a problem that a possibility of an electric discharge beyond control is left until it becomes lower than or equal to a voltage capable of starting an electric discharge and machining quality reduces.

DISCLOSURE OF THE INVENTION

This invention is performed to solve the problems as described above, and an object of the invention is to obtain a power source apparatus for wire electric discharge machining capable of implementing wire electric discharge machining with high reliability suitable for high-accurate machining.

A power source apparatus for wire electric discharge machining according to this invention as characterized in that in a power source apparatus for wire electric discharge machining capable of applying voltages of both of positive and opposite polarities to a gap between a wire electrode and a workpiece, comprising a DC power source for supplying a DC voltage to the gap between the wire electrode and the workpiece, switching means for performing switching of the DC voltage and control means for performing on-off control of the switching means, and there is provided control means for applying a first voltage pulse to the gap for predetermined time and then applying a second voltage pulse of a polarity opposite to the first voltage pulse for predetermined time necessary for the gap voltage to become a predetermined voltage lower than or equal to a voltage capable of starting an electric discharge corresponding to each machining condition in the inside of machining liquid, the inside of mist or the inside of gas, and use is made in machining for performing at least two machining of machining in the inside of the machining liquid, machining in the inside of the mist and machining in the inside of the gas in combination.

Also, a power source apparatus for wire electric discharge machining according to this invention is characterized in that in a power source apparatus for wire electric discharge machining capable of applying voltages of both of positive and opposite polarities to a gap between a wire electrode and a workpiece, comprising a DC power source for supplying a DC voltage to the gap between the wire electrode and the workpiece, switching means for performing switching of the DC voltage and control means for performing on-off control of the switching means, and there are provided voltage detection means for detecting a voltage of the gap, voltage comparison means for comparing a gap voltage detected by the voltage detection means with a predetermined voltage preset to a voltage or lower capable of starting an electric discharge corresponding to each machining condition in the inside of machining liquid; the inside of mist or the inside of gas, and control means for performing on-off control of the switching means so as to apply a first voltage pulse to the gap for predetermined time and then apply a second voltage pulse of a polarity opposite to the first voltage pulse and complete the application of the second voltage pulse when it is detected that the gap voltage becomes the predetermined voltage by the voltage comparison means, and use is made in machining for performing at least two machining of machining in the inside of the machining liquid, machining in the inside of the mist and machining in the inside of the gas in combination.

Also, a power source apparatus for wire electric discharge machining according to this invention is characterized in that in a power source apparatus for wire electric discharge machining capable of applying voltages of both of positive and opposite polarities to a gap between a wire electrode and a workpiece, comprising a DC power source for supplying a DC voltage to the gap between the wire electrode and the workpiece, switching means for performing switching of the DC voltage and control means for performing on-off control of the switching means, and there are provided voltage detection means for detecting a voltage of the gap, voltage comparison means for comparing a gap voltage detected by the voltage detection means with a predetermined voltage preset to a voltage or lower capable of starting an electric discharge corresponding to each machining condition in the inside of machining liquid, the inside of mist or the inside of gas, and control means for performing on-off control of the switching means for applying a first voltage pulse to the gap for predetermined time and then applying a second voltage pulse of a polarity opposite to the first voltage pulse so that the gap voltage becomes within a predetermined voltage lower than or equal to a voltage capable of starting an electric discharge by a comparison value through the voltage comparison means, and use is made in machining for performing at least two machining of machining in the inside of the machining liquid, machining in the inside of the mist and machining in the inside of the gas in combination.

Also, a power source apparatus for wire electric discharge machining according to this invention is characterized in that after the completion of application of the first voltage pulse, the second voltage pulse is applied after a lapse of predetermined time for prevention of breakage of the switching means.

Also, a power source apparatus for wire electric discharge machining according to this invention is characterized in that in a power source apparatus for wire electric discharge machining capable of applying voltages of both of positive and opposite polarities to a gap between a wire electrode and a workpiece, comprising a DC power source for supplying a DC voltage to the gap between the wire electrode and the workpiece, switching means for performing switching of the DC voltage and control means for performing on-off control of the switching means, and there are provided voltage detection means for detecting a voltage of the gap, voltage comparison means for comparing a gap voltage detected by the voltage detection means with a predetermined voltage preset to a voltage or lower capable of starting an electric discharge corresponding to each machining condition in the inside of machining liquid, the inside of mist or the inside of gas, average voltage detection means for detecting an average voltage of the gap, average voltage comparison means for comparing the average voltage of the gap detected by toe average voltage detection means with zero volt, and control means for performing on-off control of the switching means for applying a first voltage pulse to the gap for predetermined time and then applying a second voltage pulse of a polarity opposite to the first voltage pulse so that the gap voltage becomes within a predetermined voltage lower than or equal to a voltage capable of starting an electric discharge by a comparison value through the voltage comparison means and performing on-off control of the switching means for applying a third voltage pulse of a polarity opposite to the first voltage pulse for predetermined time and then applying a fourth voltage pulse of a polarity equal to the first voltage pulse so that the gap voltage becomes within a predetermined voltage lower than or equal to a voltage capable of starting an electric discharge by a comparison value through the voltage comparison means and performing control so as to make the average voltage of the gap at intervals of predetermined time to zero by a comparison value through the average voltage detection means, and use is made in machining for performing at least two machining of machining in the inside of the machining liquid, machining in the inside of the mist and machining in the inside of the gas in combination.

Also, a power source apparatus for wire electric discharge machining according to this invention is characterized in that a predetermined voltage lower than or equal to a voltage capable of starting an electric discharge at the time of applying the second voltage pulse or a predetermined voltage lower than or equal to a voltage capable of starting an electric discharge at the time of applying the fourth voltage pulse is set near to the voltage capable of starting the electric discharge.

Also, a power source apparatus for wire electric discharge machining according to this invention is characterized in that after the completion of application of the first voltage pulse, the second voltage pulse is applied after a lapse of predetermined time for prevention of breakage of the switching means, and after the completion of application of the third voltage pulse, the fourth voltage pulse is applied after a lapse of predetermined time for prevention of breakage of the switching means.

Since the power source apparatus for wire electric discharge machining according to this invention is constructed as described above, there is shown an effect capable of obtaining a power source apparatus for wire electric discharge machining capable of implementing wire electric discharge machining with high machining quality and high reliability suitable for high-accurate machining. Also, there is shown an effect capable of obtaining a power source apparatus for wire electric discharge machining capable of shortening machining time while preventing electrolytic corrosion of a workpiece.

BEST MODE FOR CARRYING OUT THE INVENTION

First Embodiment

Figure 1A:
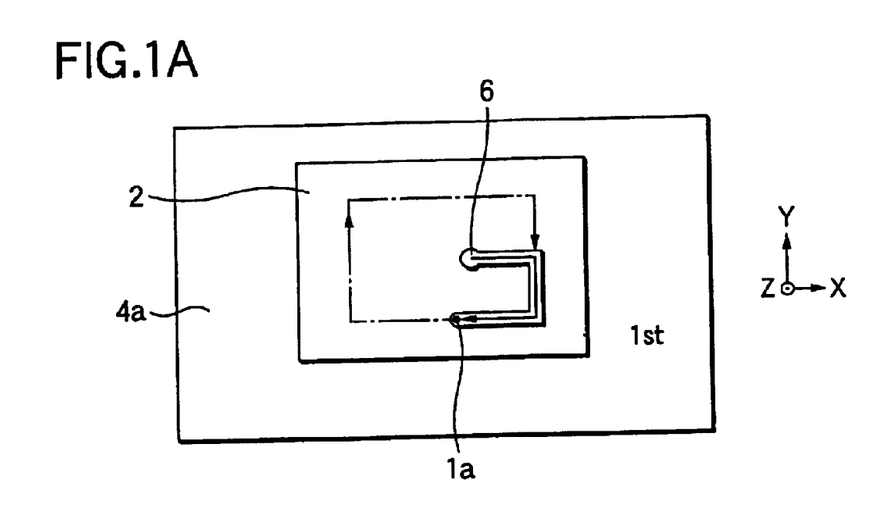
FIGS. 1A to 1C are explanatory diagrams showing one example of wire electric discharge-machining by a power source apparatus for wire electric discharge machining according to a first embodiment of this invention.
Figure 1B:
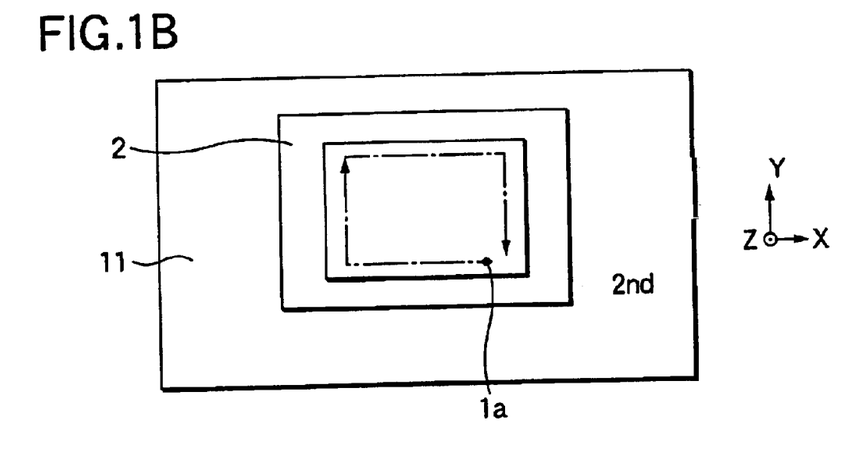
Figure 1C:
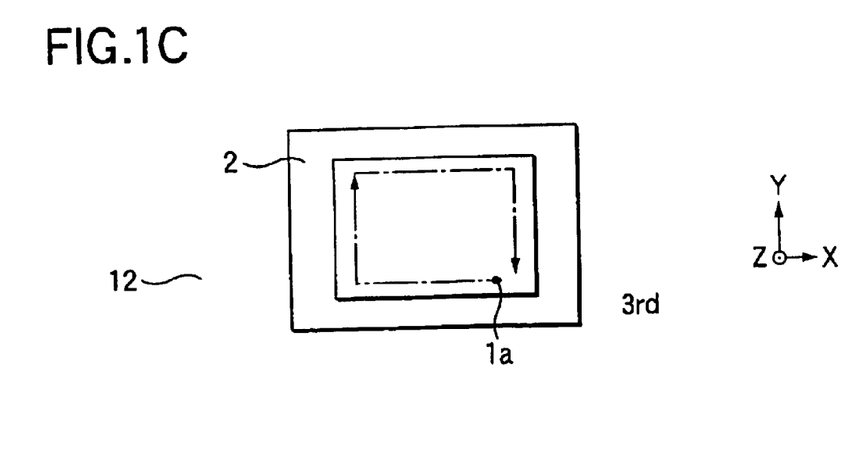

FIGS. 1A to 1C are explanatory diagrams showing one example of wire electric discharge machining by a power source apparatus for wire electric discharge machining according to a first embodiment of this invention, and in the drawing, numeral $1a$ is a wire electrode, and numeral 2 is a workpiece, and numeral $4a$ is water which is machining liquid, and numeral 6 is an initial hole, and numeral 11 is mist of water etc., and numeral 12 is gas such as air, and FIG. 1A shows a first cut which is rough machining, and FIG. 1B shows a second cut which is semi-finishing machining after the rough machining, and FIG. 1C shows a third cut which is final finishing machining. The first cut, the second cut and the third cut are used for the sake of convenience, and wire electric discharge machining is not necessarily completed in three processes. In machining with low requirement accuracy to the workpiece, if may be completed by only the first cut, or only the first cut and the second cut, and in machining with high requirement accuracy to the workpiece, machining may be performed as large as seven or eight times.

The first cut of FIG. 1A is the machining for passing the wire electrode $1a$ through the initial hole 6 and boring the workpiece 2. In the first cut, since surface roughness and accuracy are finished in the subsequent machining, strict surface roughness and accuracy are not very required and it is important to increase a machining speed particularly in order to improve productivity, and machining is performed with the intervention of the water $4a$ which is machining liquid in a gap by machining liquid supply means for supplying the machining liquid to the gap in a manner similar to FIGS. 9A to 9C of the background art. As this machining liquid supply means, at least one of means for storing the water $4a$ in a machining bath to immerse the workpiece 2 and means for jetting the water $4a$ to the gap is used.

In the second cut which is semi-finishing machining of FIG. 1B, machining in the inside of the mist 11 rather than machining in the inside of the machining liquid $4a$ is performed in order to suppress vibration of the wire electrode $1a$ to improve machining shape accuracy. A machining speed in the inside of the mist 11 bears comparison with the machining in the inside of the machining liquid $4a$, and machining accuracy improves since vibration of the wire electrode $1a$ due to electrostatic force is suppressed. The machining in the inside of the mist 11 can be performed by jetting the mist to a gap between the wire electrode $1a$ and the workpiece 2, for example, by mist supply means (not shown).

In the third cut which is final finishing machining of FIG. 1C, vibration of the wire electrode 1a can be suppressed further by using an electric discharge in the inside of the gas 12. Machining in the inside of the gas 12 can be performed by jetting gas with a predetermined component to the gap between the wire electrode 1a and the workpiece 2 in the atmosphere or by gas supply means (not shown).

The reasons why high accuracy is obtained by the wire electric discharge machining of the inside of the mist 11 and the inside of the gas 12 as described above are as follows. Since electrostatic force acting on the wire electrode 1a and the workpiece 2 at the time of applying a voltage to the gap is proportional to a dielectric constant of the gap, when calculation is made as the same gap distance, the electrostatic force of the case that an inclusion of the gap is the mist 11 or the gas 12 becomes a factor of several tens as compared with that of the case that an inclusion of the gap is the water 4a (for example, the dielectric constant in a vacuum is smallest and the dielectric constant in the water is about 80 times the dielectric constant in the vacuum). Also, since vaporization explosion force due to an electric discharge occurs by liquid intervening in the gap, the wire electrode 1a is not much affected by the vaporization explosive force when only the mist 11 or the gas 12 is present in the gap.

Therefore, high-accurate wire electric discharge machining can be performed by an electric discharge in the inside of the mist 11 or the inside of the gas 12, and requirement specifications can be handled properly by performing the machining in the inside of the machining liquid, the machining in the inside of the mist and the machining in the inside of the gas in combination according to productivity and requirement accuracy to the workpiece and so on.

In the wire electric discharge machining, by a DC power source of the power source apparatus for wire electric discharge machining, a DC voltage is supplied to a gap between the wire electrode 1a and the workpiece 2 to generate an electric discharge in the gap and the machining is advanced while relatively moving the wire electrode 1a and the workpiece 2, and the DC voltage supplied to, the gap is controlled by turning on or off switching means. Also, the amount of energy stored by a floating capacitance etc. of the gap not only changes depending on a size of the workpiece, a machining state, etc. but also changes greatly depending on conditions of inclusions such as machining liquid of the gap, namely machining in the inside of machining liquid by immersion or spray, machining in the inside of mist or machining in the inside of gas. Therefore, in the case of performing the wire electric discharge machining in the inside of the machining liquid, the inside of the mist and the inside of the gas in combination as shown in FIG. 1, when a conventional power source apparatus for wire electric discharge machining as shown in FIG. 10 is used, a change in time necessary for consumption of energy is large and electric discharge energy of the case that an electric discharge occurs during energy consumption varies and it is difficult to implement stable machining and machining quality reduces.

Figure 2:
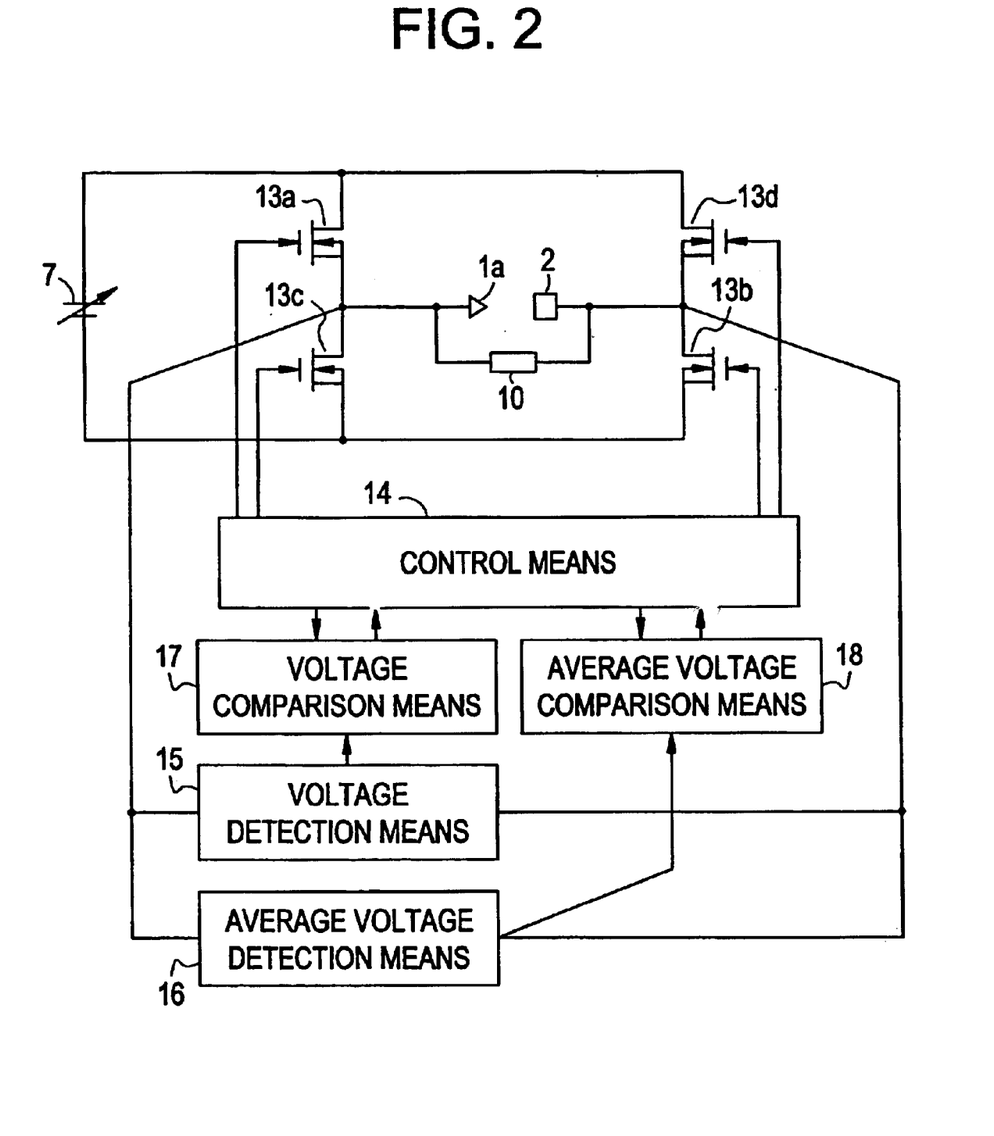
FIG. 2 is a block diagram showing a configuration of the power source apparatus for wire electric discharge machining according to the first embodiment of this invention.

FIG. 2 is a block diagram showing a configuration of the power source apparatus for wire electric discharge machining according to the first embodiment of this invention, and in the drawing, numeral 1a is a wire electrode, and numeral 2 is a workpiece, and numeral 7 is a DC power source for supplying a DC voltage to a gap between the wire electrode 1a and the workpiece 2, and numeral 10 is a gap resistor, and numerals 13a, 13b, 13c and 13d are switching means of a field-effect transistor etc. for performing switching of the DC voltage, and numeral 14 is control means for performing on-off control of the switching means 13a, 13b, 13c and 13d, and numeral 15 is voltage detection means for detecting a voltage of the gap, and numeral 16 is average voltage detection means for detecting an average voltage of the gap, and numeral 17 is voltage comparison means for comparing a voltage detection value of the voltage detection means 15 with a setting value, and numeral 18 is average voltage comparison means for comparing an average voltage detection value of the average voltage detection means 16 with a setting value. Thus, the power source apparatus for wire electric discharge machining according to the first embodiment of this invention adopts a switching circuit of a bridge configuration capable of applying voltages of both of positive and opposite polarities to the gap between the wire electrode 1a and the workpiece 2.

Figure 3A:
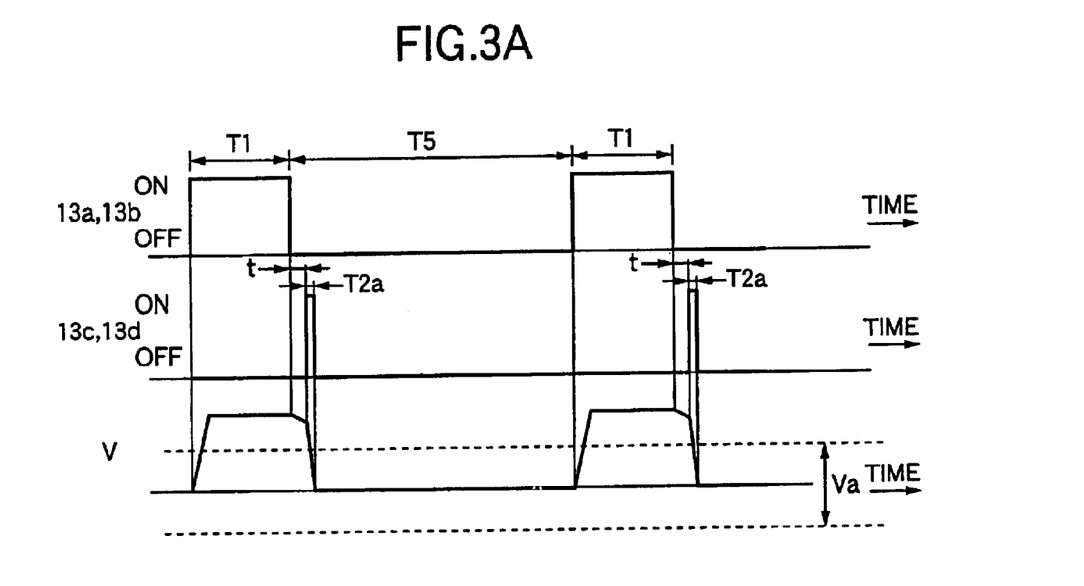
FIGS. 3A and 3B are explanatory diagrams showing on-off control of switching means and a gap voltage waveform in the power source apparatus for wire electric discharge machining according to the first embodiment of this invention.
Figure 3B:
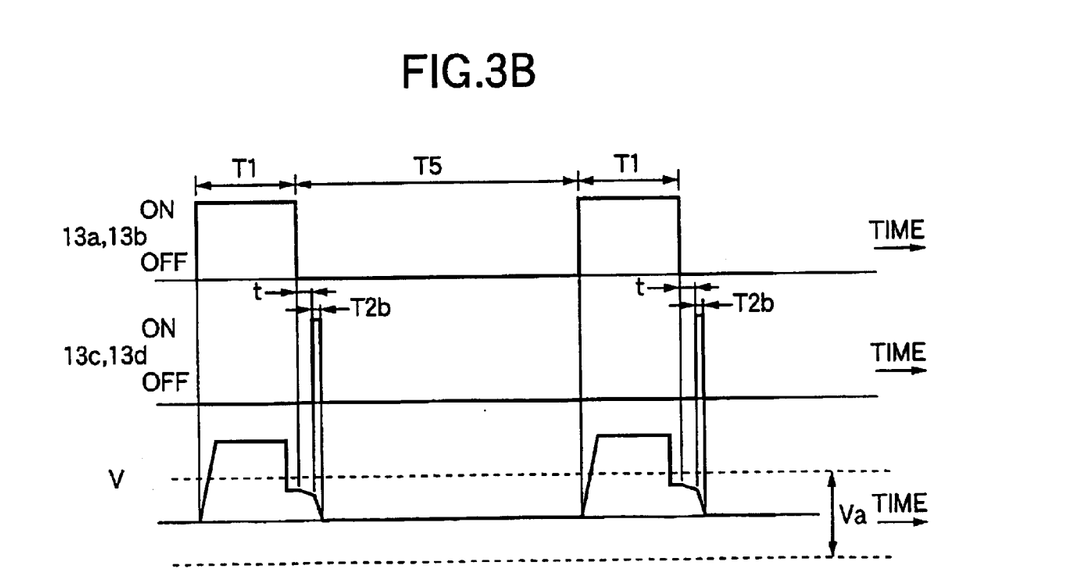

FIGS. 3A and 3B are explanatory diagrams showing on-off control of switching means and a gap voltage waveform in the power source apparatus for wire electric discharge machining according to the first embodiment of this invention, and FIG. 3A shows the case that an electric discharge does not occur at the end of predetermined time T1, and FIG. 3B shows the case that an electric discharge occurs at the end of predetermined time T1. In FIGS. 3A and 3B, V shows a gap voltage, and T1 shows applied time of a voltage pulse (predetermined time for which the switching means 13a and 13b are turned on), and t shows predetermined time set for prevention of breakage of the switching means, and T2a and T2b show predetermined time for which the switching means 13c and 13d are turned on after a lapse of the predetermined time t, and T5 shows pause time, and Va shows a range of the gap voltage lower than or equal to a voltage capable of starting an electric discharge.

By a control signal from the control means 14 of FIG. 2, after the switching means 13a and 13b are turned on as shown in FIG. 3, the switching means 13a and 13b are turned off after a lapse of the predetermined time, T and thereafter, the switching means 13c and 13d are turned on after a lapse of the predetermined time t, and the switching means 13c and 13d are turned off after a lapse of the predetermined time T2a for FIG. 3A and after a lapse of the predetermined time T2b for FIG. 3B. As the predetermined time T2a and T2b, predetermined time necessary for the gap voltage V to become an arbitrary voltage within the voltage range Va (predetermined time necessary for the gap voltage V to become zero for FIGS. 3A and 3B) may be preset by machining conditions such as a size of a workpiece or an electrical condition corresponding to machining in the inside of machining liquid, machining in the inside of mist and machining in the inside of gas.

Or, instead of presetting the predetermined time T2a and T2b, it maybe constructed so as to turn off the switching means 13c and 13d when a voltage detection value detected by the voltage detection means 15 is compared with a predetermined setting value within the voltage range Va by the voltage comparison means 17 and the gap voltage V becomes the setting value.

In FIGS. 3A and 3B, the reason why the predetermined time t is provided is because when a time zone in which the switching means 13a or 13b and 13c or 13d have been turned on simultaneously is present, a short-circuit current occurs and the switching means break down, and as the predetermined time t, for example, time of the order of 500 ns may be set. A value of this predetermined time t can be decreased since switching means with a high operating speed can be used in the case that an applied voltage is low, and increases since it is necessary to use switching means with a high dielectric strength and a low operating speed when the applied voltage is increased for a kind of a workpiece or high-speed machining.

Also, when on-off control of the switching means can be performed so that the time zone in which the switching means 13a or 13b and 13c or 13d have been turned on simultaneously is not present, there is no need to provide the predetermined time t.

As described above, by applying a voltage of a polarity opposite to a voltage of the predetermined time T1 by turning on the switching means 13c and 13d for predetermined time T2 after the completion of application of a voltage pulse of the predetermined time T1, a fall of the voltage remaining in the gap as shown in FIGS. 3A and 3B can be performed speedily, for example, in a switching circuit of a bridge configuration capable of applying voltages of both of positive and opposite polarities as shown in FIG. 2.

By speedily performing the fall of the residual voltage of the gap to remove the residual voltage in this manner, electrostatic force occurring between the wire electrode and the workpiece due to the residual voltage can be suppressed. Therefore, since vibration of the wire electrode can be suppressed in any of machining in the inside of machining liquid, machining in the inside of mist and machining in the inside of gas, a reduction in machining accuracy of the workpiece can be prevented in the case of performing the machining in the inside of the machining liquid, the machining in the inside of the mist and the machining in the inside of the gas in combination.

Also, an electric discharge caused by the residual voltage of the gap can be prevented and only an electric discharge within voltage application time capable of control can be provided, so that machining quality can be improved.

Further, the pause time T5 of FIGS. 3A and 3B can be shortened and machining time can be shortened.

Figure 4:
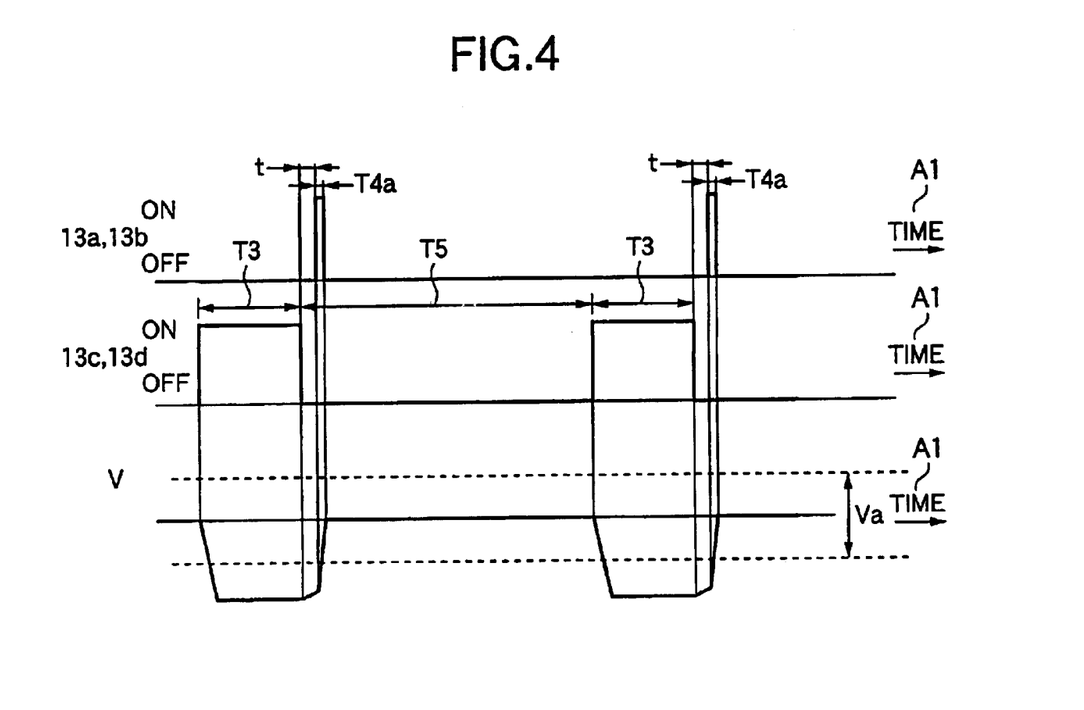
FIG. 4 is an explanatory diagram showing on-off control of the switching means and a gap voltage waveform in the power source apparatus for wire electric discharge machining according to the first embodiment of this invention.

Also, when on-off control of the switching means of FIGS. 3A and 3B in the above description is performed as shown in FIG. 4, a similar effect is shown.

Figure 5:
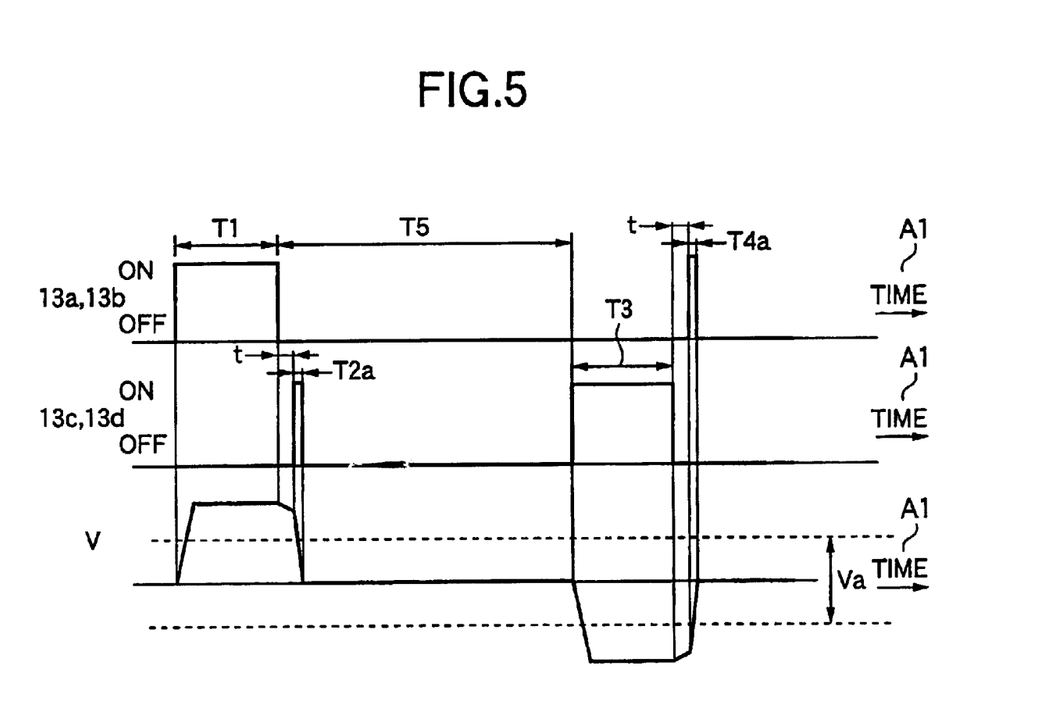
FIG. 5 is an explanatory diagram showing on-off control of the switching means and a gap voltage waveform in the power source apparatus for wire electric discharge machining according to the first embodiment of this invention.

Also, FIG. 5 is the case that a voltage in predetermined time T3 is set to a polarity opposite to a voltage in the predetermined time T1, and an effect similar to the case of performing on-off control of the switching means as shown in FIG. 3 is shown. Further, in FIG. 5, there is an effect capable of preventing electrolytic corrosion of the workpiece in the case of comparing an average voltage detection value detected by the average voltage detection means 16 of FIG. 2 with a voltage setting value set to zero volt by the average voltage comparison means 18 and performing on-off control of the switching means 13a, 13b, 13c and 13d by the control means 14 so as to make this average voltage detection value to zero (so-called zero volt control).

Second Embodiment

Figure 6:
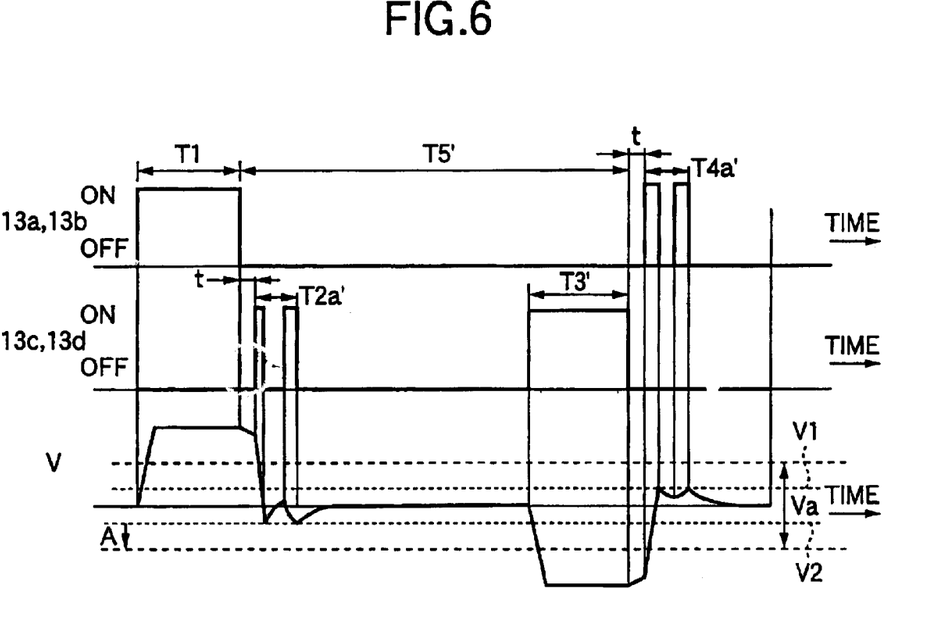
FIG. 6 is an explanatory diagram showing on-off control of switching means and a gap voltage waveform in a power source apparatus for wire electric discharge machining according to second and third embodiments of this invention.

FIG. 6 is an explanatory diagram showing on-off control of switching means and a gap voltage waveform in a power source apparatus for wire electric discharge machining according to a second embodiment of this invention, and in the drawing, V shows a gap voltage, and Va shows a range of the gap voltage lower than or equal to a voltage capable of starting an electric discharge, and V1 and V2 show predetermined voltages within the voltage range Va, and T1 shows applied time of a voltage pulse (predetermined time for which switching means 13a and 13b are-turned on), and t shows predetermined time set for prevention of breakage of the switching means, and T2a' shows predetermined time for which on-off control of switching means 13c and 13d are performed after a lapse of the predetermined time T1 and t, and T3' shows applied time of a voltage pulse (predetermined time for which the switching means 13c and 13d are turned on), and T4a' shows predetermined time for which on-off control of the switching means 13a and 13b are performed after a lapse of the predetermined time T3' and t, and T5' shows pause time. Also, a block diagram showing a configuration of the power source apparatus for wire electric discharge machining is similar to that of FIG. 2 shown in the first embodiment.

In the power source apparatus for wire electric discharge machining according to the second embodiment, since the residual voltage of a gap changes depending on a machining state and an applied voltage and so on, it is controlled so that a voltage after a fall of a voltage pulse in the gap is maintained within a predetermined voltage in the voltage range Va using the voltage detection means 15 for detecting a voltage of the gap of FIG. 2 and the voltage comparison means 17 for comparing a predetermined voltage with a voltage of the gap in respective positive and opposite polarities.

First, for example, a voltage of a positive polarity is applied for the predetermined time T1 and then, a voltage of the opposite polarity is applied after a lapse of the predetermined time t so that the switching means do not break down, and a voltage of the gap is detected using the voltage detection means 15, and the predetermined voltage V2 is compared with the voltage of the gap using the voltage comparison means 17 and in the case of reaching the predetermined voltage V2, the switching means 13c and 13d are turned off immediately, and on-off operations of the switching means 13c and 13d are repeated for the predetermined time T2a' so that the gap voltage does not become the predetermined voltage V2 or lower.

Also, a voltage of the opposite polarity side is applied for the predetermined time T3' and then, a voltage of the positive polarity side is applied after a lapse of the predetermined time t so that the switching means do not break down, and a voltage of the gap is detected using the voltage detection means 15, and the predetermined voltage V1 set within the range Va of the gap voltage lower than or equal to a voltage capable of starting an electric discharge is compared with the voltage of the gap using the voltage comparison means 17 and in the case of reaching the predetermined voltage V1, the switching means 13a and 13b are turned off immediately, and on-off operations of the switching means 13a and 13b are repeated for the predetermined time T4a' so that the gap voltage does not become the predetermined voltage V1 or higher.

By performing on-off control of the switching means as described above, after a lapse of the predetermined voltage pulse applied time (T1 and T3'), a fall of the residual voltage of the gap can be performed speedily and also a level of the residual voltage of the gap can be set to a voltage or lower capable of starting an electric discharge, and an electric discharge can be suppressed during the time T2a' and T4a', so that the effect capable of improving machining quality etc. similar to that of the first embodiment is shown.

Figure 7A:
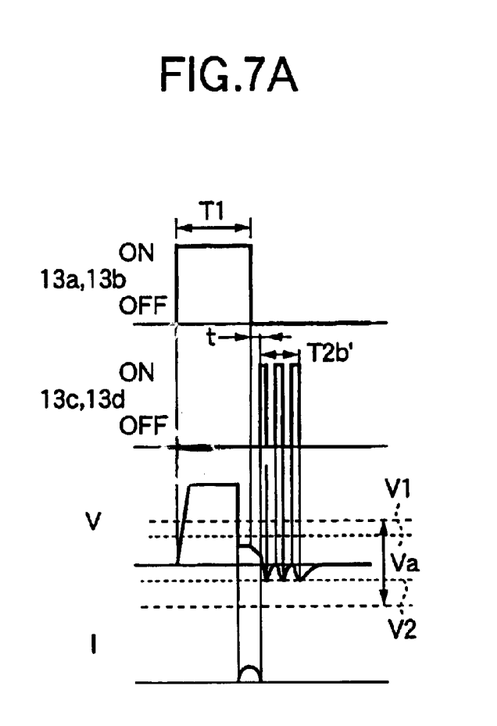
FIGS. 7A and 7B are explanatory diagrams at the time of electric discharge generation showing on-off control of the switching means, a gap voltage waveform and a gap current waveform in the power source apparatus for wire electric discharge machining according to the second embodiment of this invention.
Figure 7B:
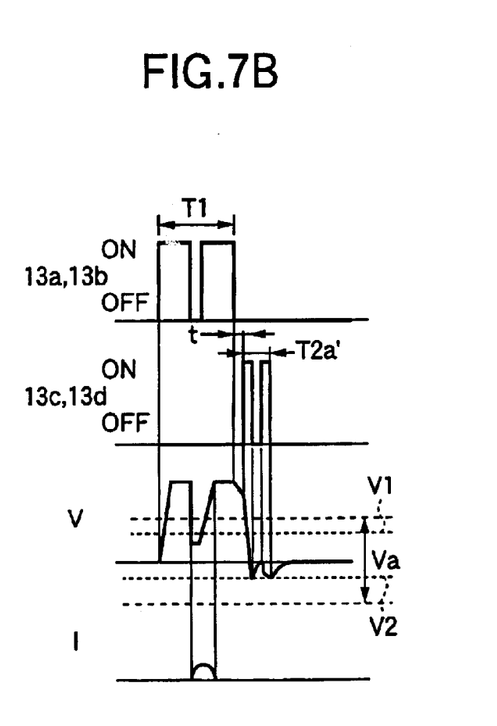
Figure 8A:
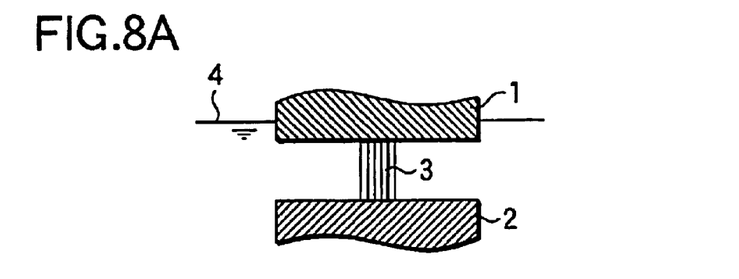
FIGS. 8A to 8E are explanatory diagrams of a mechanism of electric discharge machining.
Figure 8B:
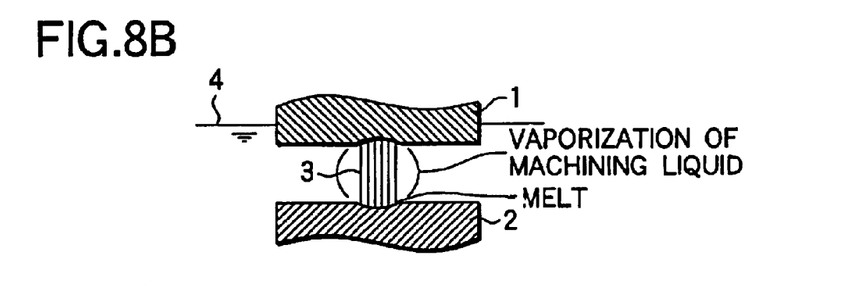
Figure 8C:
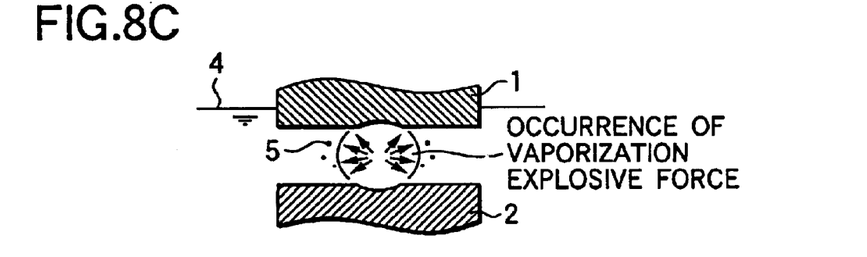
Figure 8D:
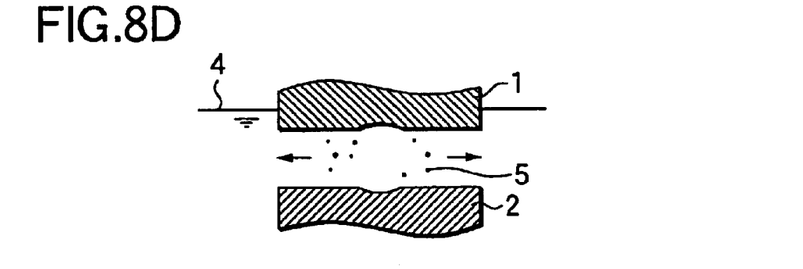
Figure 8E:
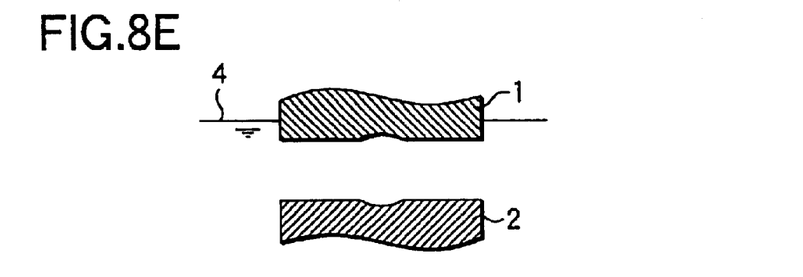

FIGS. 7A and 7B are explanatory diagrams at the time of electric discharge generation, showing on-off control of the switching means, a gap voltage waveform and a gap current waveform in the power source apparatus for wire electric discharge machining according to the second embodiment of this invention, and V is a gap voltage, and I is a gap current, and T1 is applied time of a voltage pulse (predetermined time for which the switching means 13a and 13b are turned on), and t is predetermined time set for prevention of breakage of the switching means, and T2a' and T2b' are predetermined time for which on-off control of the switching means 13c and 13d are performed after a lapse of the predetermined time T1 and t. As shown in FIG. 7(a), when an electric discharge occurs at the end of the predetermined time T1, since a voltage in a machining gap becomes within the voltage range Va, the voltage reaches the predetermined voltage V2 in a short time and the first applied time of a voltage pulse within the time T2b' becomes short, but application of a voltage within this predetermined time T2b' maybe performed in a manner similar to FIG. 6. Also, as shown in FIG. 7B, when an electric discharge occurs within the predetermined time T1 and an electric discharge does not occur at the end of the predetermined time T1, application of a voltage within the time T2a' may be performed in a manner similar to FIG. 6. Also, for example, when a voltage with group pulse shape used in finishing machining of a third cut, a fourth cut, etc. is applied, depending on whether or not an electric discharge occurs at the end of predetermined voltage pulse applied time, application of a voltage within the time T2b' or T2a' may be performed as shown in FIG. 7A or 7B.

Third Embodiment

FIG. 6 is also an explanatory diagram showing on-off control of switching means and a gap voltage waveform in a power source apparatus for wire electric discharge machining according to a third embodiment of this invention, and a block diagram showing a configuration of the power source apparatus for wire electric discharge machining is similar to that of FIG. 2 shown in the first embodiment. However, in the third embodiment, applied time T3' of a voltage pulse is not predetermined time but time to be controlled.

In the third embodiment, in addition to the second embodiment, control (so-called zero volt control) for making an average voltage of a gap at predetermined time intervals to zero using the average voltage detection means 16 and the average voltage comparison means 18 of FIG. 2 is added in order to prevent electrolytic corrosion of a workpiece. That is, an average voltage within constant time in the gap is detected by the average voltage detection means 16 and this average voltage detection value is compared with a voltage setting value set to zero volt by the average voltage comparison means 18 and time of applied time T3' of a voltage pulse of a polarity opposite to a voltage of predetermined time T1 is controlled so as to make this average voltage detection value to zero (control similar to that of the description of FIG. 5 of the first embodiment is performed), and there is an effect capable of preventing the electrolytic corrosion of the workpiece.

Also, in FIG. 6, when a predetermined voltage V2 is brought as near as possible to the end of a voltage range Va, for example, as shown by an arrow A (that is, when it is set within the voltage range Va and near to a voltage capable of starting an electric discharge), an average voltage of a polarity opposite to a voltage within the predetermined time T1 increases within time T2a', so that the voltage pulse applied time T3' of FIG. 6 can be made shorter than the voltage pulse applied time T3 of FIG. 5 when zero volt control is performed (that is, T3'<T3). Also, the voltage pulse applied time T3' can be shortened further by lengthening the time T2a' more. In this case, for example, machining is easy to proceed in a voltage polarity of the predetermined time T1 and machining is difficult to proceed in a voltage polarity of the predetermined time T3', so that machining productivity does not reduce even when the voltage pulse applied time T3' becomes short.

The ability to shorten the voltage pulse applied time T3' means that time from the voltage applied time T1 in FIG. 6 to the next voltage applied time T1 can be shortened. That is, by performing the on-off control of the switching means and the zero volt control as shown in FIG. 6, electrolytic corrosion of a workpiece can be prevented and also machining time can be shortened.

Though the case of performing control of the voltage pulse applied time for the zero volt control by means of the time T3' has been described above, for example, the control may be performed by means of the time T1 or T4'.

Though the case that a configuration of the power source apparatus for electric discharge machining is a bridge configuration using one DC power source as shown in FIG. 2 has been shown in the description of the above embodiments of this invention, there may be a configuration capable of applying voltages of both of positive and opposite polarities to a gap between a wire electrode and a workpiece, for example, a configuration using two DC power sources as disclosed in JP-A-1-257513.

INDUSTRIAL APPLICABILITY

As described above, a power source apparatus for wire electric discharge machining according to this invention is suitable for use in particularly high-accuracy wire electric discharge machining operations.

What is claimed is:

1. A power source apparatus for wire electric discharge machining capable of applying voltages of both of positive and opposite polarities to a gap between a wire electrode and a workpiece, comprising a DC power source for supplying a DC voltage to the gap between the wire electrode and the workpiece, switching means for performing switching of the DC voltage and control means for performing on-off control of the switching means, characterized in that there is provided control means for applying a first voltage pulse to the gap for predetermined time and then applying a second voltage pulse of a polarity opposite to the first voltage pulse for predetermined time necessary for the gap voltage to become a predetermined voltage lower than or equal to a voltage capable of starting an electric discharge corresponding to each machining condition of machining in machining liquid, machining in mist or machining in gas, and use is made in machining for performing at least two machining operations selected from machining in the machining liquid, machining in the mist and machining in the gas.

2. A power source apparatus for wire electric discharge machining capable of applying voltages of both of positive and opposite polarities to a gap between a wire electrode and a workpiece, comprising a DC power source for supplying a DC voltage to the gap between the wire electrode and the workpiece, switching means for performing switching of the DC voltage and control means for performing on-off control of the switching means, characterized in that there are provided voltage detection means for detecting a voltage of the gap, voltage comparison means for comparing a gap voltage detected by the voltage detection means with a predetermined voltage preset to a voltage or lower capable of starting an electric discharge corresponding to each machining condition of machining in machining liquid, machining in mist or machining in gas, and control means for performing on-off control of the switching means so as to apply a first voltage pulse to the gap for predetermined time and then apply a second voltage pulse of a polarity opposite to the first voltage pulse and complete the application of the second voltage pulse when it is detected that the gap voltage becomes the predetermined voltage by the voltage comparison means, and use is made in machining for performing at least two machining operations selected from machining in the machining liquid, machining in the mist and machining in the gas.

3. A power source apparatus for wire electric discharge machining capable of applying voltages of both of positive and opposite polarities to a gap between a wire electrons and a workpiece, comprising a DC power source for supplying a DC voltage to the gap between the wire electrode and the workpiece, switching means for performing switching of the DC voltage and control means for performing on-off control of the switching means, characterized in that there are provided voltage detection means for detecting a voltage of the gap, voltage comparison means for comparing a gap voltage detected by the voltage detection means with a predetermined voltage preset to a voltage or lower capable of starting an electric discharge corresponding to each machining condition of machining in machining liquid, machining in mist or machining in gas and control means for performing on-off control of the switching means for applying a first voltage pulse to the gap for predetermined time and then applying a second voltage pulse of a polarity opposite to the first voltage pulse so that the gap voltage becomes within a predetermined voltage lower than or equal to a voltage capable of starting an electric discharge by a comparison value through the voltage comparison means, and use is made in machining for performing at least two machining operations selected from machining in the machining liquid, machining in the mist and machining in the gas.

4. A power source apparatus for wire electric discharge machining as in any of claims 1–3, characterized in that after the completion of application of the first voltage pulse, the second voltage pulse is applied after a lapse of predetermined time for prevention of breakage of the switching means.

5. A power source apparatus for wire electric discharge machining capable of applying voltages of both of positive and opposite polarities to a gap between a wire electrode and a workpiece, comprising a DC power source for supplying a DC voltage to the gap between the wire electrode and the workpiece, switching means for performing switching of the DC voltage and control means for performing on-off control of the switching means, characterized in that there are provided voltage detection means for detecting a voltage of the gap, voltage comparison means for comparing a gap voltage detected by the voltage detection means with a predetermined voltage preset to a voltage or lower capable of starting an electric discharge corresponding to each machining condition of machining in machining liquid, machining in mist or machining in gas, average voltage detection means for detecting an average voltage of the gap, average voltage comparison means for comparing the average voltage of the gap detected by the average voltage detection means with zero volt, and control means for performing on-off control of the switching means for applying a first voltage pulse to the gap for predetermined time and then applying a second voltage pulse of a polarity opposite to the first voltage pulse so that the gap voltage becomes within a predetermined voltage lower than or equal to a voltage capable of starting an electric discharge by a comparison value through the voltage comparison means and performing on-off control of the switching means for applying a third voltage pulse of a polarity opposite to the first voltage pulse for predetermined time and then applying a fourth voltage pulse of a polarity equal to the first voltage pulse so that the gap voltage becomes within a predetermined voltage lower than or equal to a voltage capable of starting an electric discharge by a comparison value through the voltage comparison means and performing control so as to make the average voltage of the gap at intervals of predetermined time to zero by a comparison value through the average voltage detection means, and use is made in machining for performing at least two machining operations selected from machining in the machining liquid, machining in the mist and machining in the gas.

6. A power source apparatus for wire electric discharge machining as defined in claim 5, characterized in that a predetermined voltage lower than or equal to a voltage capable of starting an electric discharge at the time of applying the second voltage pulse or a predetermined voltage lower than or equal to a voltage capable of starting an electric discharge at the time of applying the fourth voltage pulse is set near to the voltage capable of starting the electric discharge.

7. A power source apparatus for wire electric discharge machining as defined in claim 5, characterized in that after the completion of application of the first voltage pulse, the second voltage pulse is applied after a lapse of predetermined time for prevention of breakage of the switching means, and after the completion of application of the third voltage pulse, the fourth voltage pulse is applied after a lapse of predetermined time for prevention of breakage of the switching means.

* * * * *